July 3, 1962  M. LUKAWSKY  3,042,150
EMERGENCY BRAKE AND ANTI-SKID DEVICE
Filed Jan. 26, 1960  3 Sheets-Sheet 1
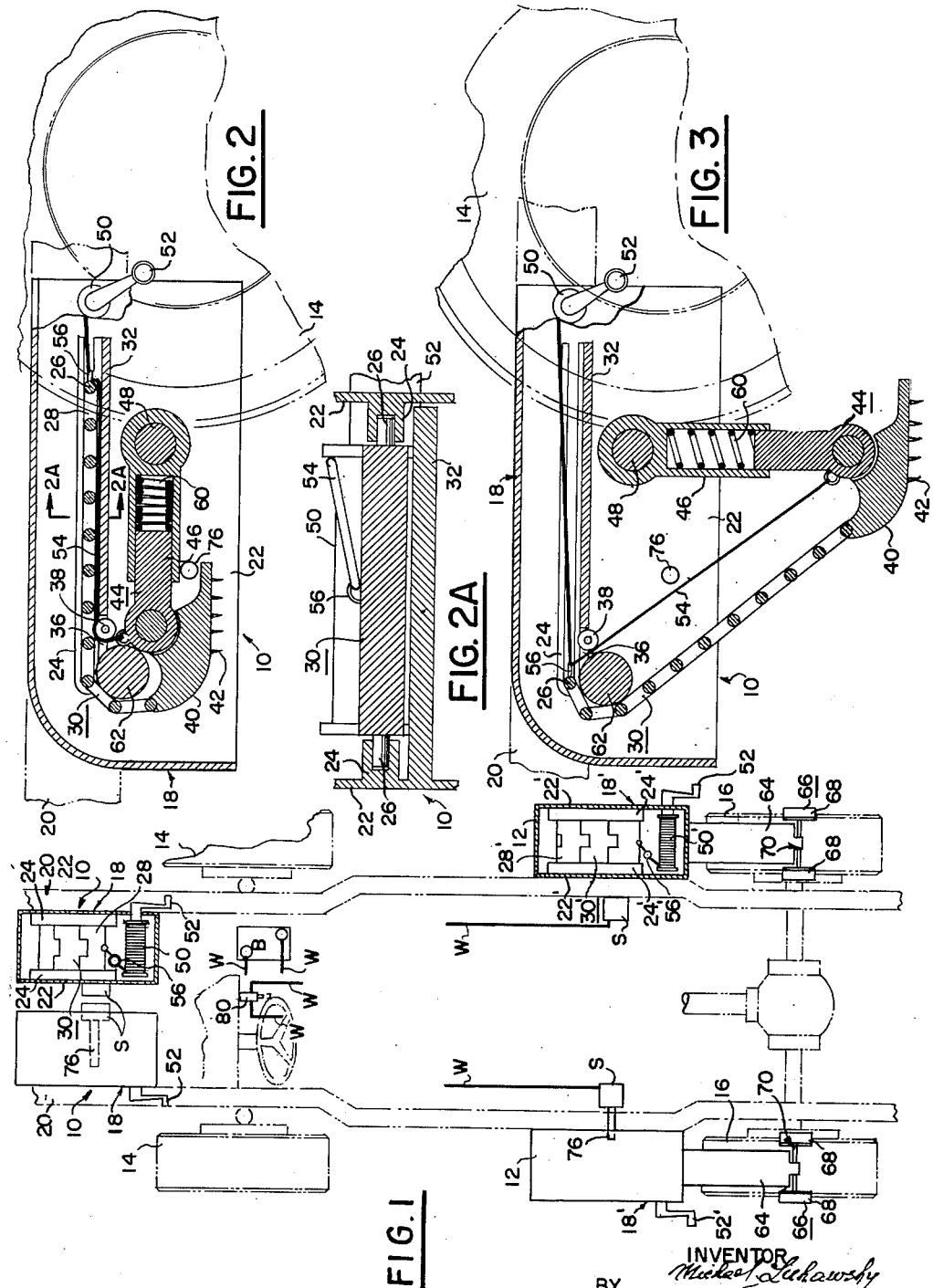
INVENTOR
Michael Lukawsky
BY
Louis Necho
ATTORNEY

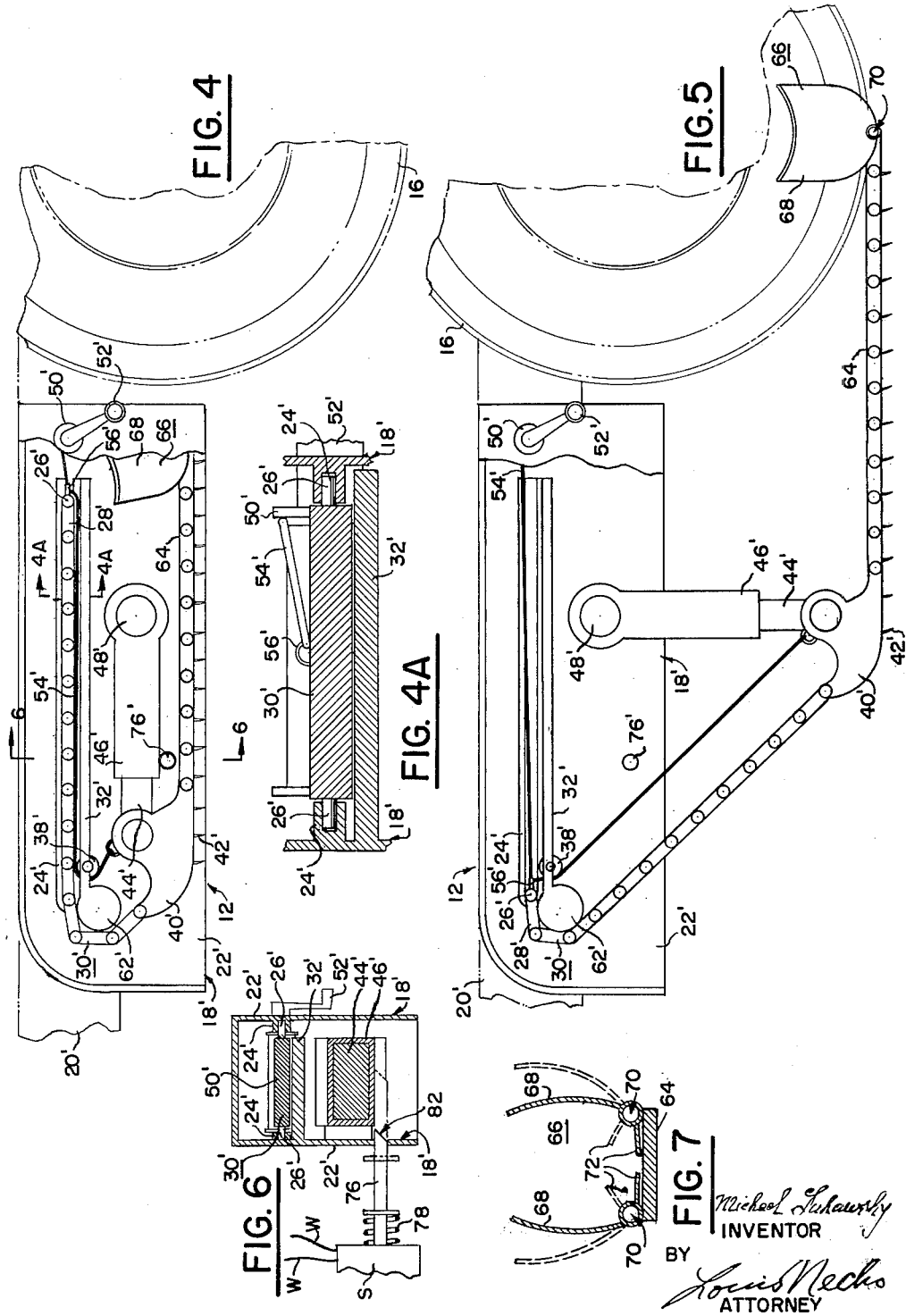

July 3, 1962　　　M. LUKAWSKY　　　3,042,150
EMERGENCY BRAKE AND ANTI-SKID DEVICE
Filed Jan. 26, 1960　　　3 Sheets-Sheet 3

Michael Lukawsky
INVENTOR

BY Louis Necho

ATTORNEY

United States Patent Office 3,042,150
Patented July 3, 1962

3,042,150
EMERGENCY BRAKE AND ANTI-SKID DEVICE
Michael Lukawsky, 871 N. 22nd St., Philadelphia, Pa.
Filed Jan. 26, 1960, Ser. No. 4,801
1 Claim. (Cl. 188—4)

My invention relates to an emergency brake and anti-skid device of the type disclosed in Patent No. 1,402,279.

One object of the invention is to produce an improved device of the type set forth.

A further object is to produce an emergency brake and anti-skid device which can be applied instantly and which can be readily returned to, and stored in, an inoperative position until it is needed.

The full nature of the invention will be understood from the following specification and the accompanying drawings in which:

FIG. 1 is a diagrammatic top plan view of the chassis of a motor vehicle embodying the invention.

FIG. 2 is an enlarged view, partly in section and partly in elevation, showing the application of the invention to a front of the vehicle with the emergency brake and anti-skid device shown in its upper, ineffective position.

Figure 8:
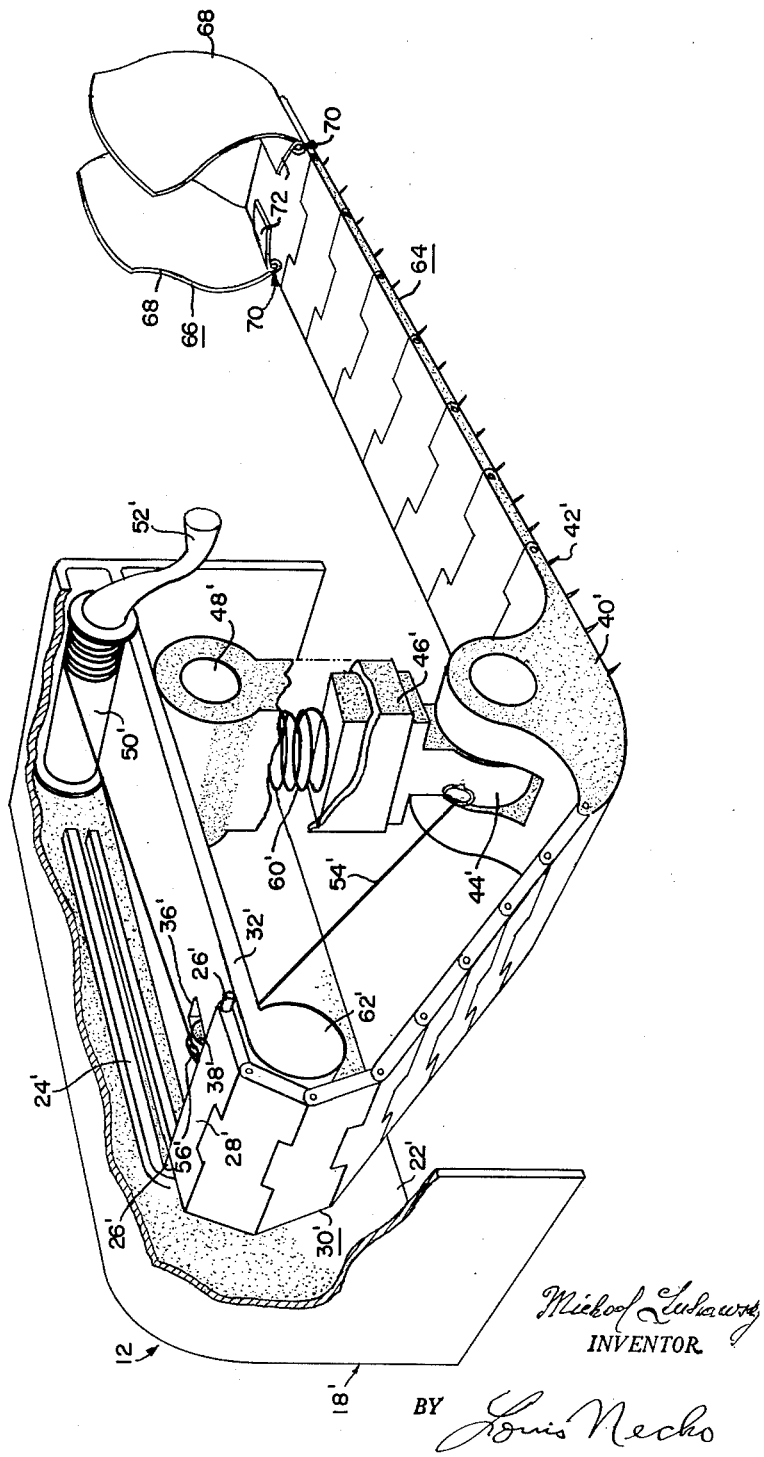

FIG. 2–A is a sectional view looking in the direction of line 2–A—2–A on FIG. 2.

FIG. 3 is similar to FIG. 2 but shows the device in its lower, or effective position.

FIGS. 4 and 5 are similar to FIGS. 2 and 3, but show the application of the invention to a rear wheel of the vehicle.

FIG. 4–A is a sectional view looking in the direction of line 4–A—4–A on FIG. 4.

FIG. 6 is a view, partly in horizontal section and partly in top plan, looking in the direction of line 6—6 on FIG. 4.

FIG. 7 is an end elevational view of the clamping device which is shown below the wheel in FIG. 5.

FIG. 8 is an enlarged perspective view better to illustrate the details of construction.

As can be seen from FIG. 1, the vehicle is provided with a pair of front emergency brake and anti-skid devices 10 and with a pair of rear emergency brake and anti-skid devices 12. The front devices 10 are disposed in advance, and inwardly of, the inboard sides of the front wheels 14 so as not to interfere with the steering of the vehicle and the rear devices 12 and disposed in line with the rear wheels 16 of the vehicle so as to cooperate directly therewith.

Except for their left and right hand orientation, the front devices 10 are identical and the same is true of the rear devices 12 and, therefore, it is thought that a description of the structure of one of the front devices 10 and of one of the rear devices 12, will suffice.

As will appear from FIGS. 2, 2–A and 3, each of the front emergency brake and anti-skid devices includes a housing 18 which is suitably secured to the frame or chassis members 20 and which encloses the operating mechanism of the device. Carried by the side walls 22 of each housing 18 are a pair of oppositely facing channels 24 which are adapted to receive, and guide, pins 26 which project from the end link 28 of a chain 30. Below channels 24 is a fixed track 32 which movably supports chain 30 and which is provided with an opening 36 through which projects an idle roller 38 which will be further referred to. The other end of chain 30 is connected to a shoe 40, the bottom of which is provided with spikes 42. Shoe 40 is carried by one end of a plunger 44, the other end of which is slidable in sleeve 46 which is pivoted on pin 48 which is fixedly carried by the opposite sides of casing 18. Numeral 50 designates a drum which is turned by a crank handle 52 which, as will be seen from FIG. 1, is disposed on the outboard side of each emergency brake and anti-skid device so as to be readily accessible. One end of a cable 54 is connected to one end of a plunger 44 and the other end thereof is passed through hook 56 on the leading end of link 28 and over roller 38, and is connected to drum 50. Plunger 44 is normally biased outwardly of sleeve 46, or downwardly, as viewed in FIGS. 2 and 3, by a spring 60. Adjacent the end of track 32 is a roller or other rounded member 62 which is carried by the side walls 22 of the housing and over which chain 30 moves between the positions of FIGS. 2 and 3.

Except as hereinafter set forth, each of rear devices 12 includes the same parts as its corresponding front device 10 and, therefore, the parts of the rear devices 12 are designated with the prime of the reference numerals used to designate the corresponding parts of device 10.

As will be seen from FIGS. 4 and 5, each rear device 12 is located in alignment with the corresponding rear wheel and includes extension 64 which is preferably flexible and which is adapted to underlie the adjacent rear wheel and clamping device 66 which is best shown in FIG. 7. Each clamping device includes two leaves 68 which are hinged at 70 to extension 64 and have inwardly projecting ears 72. The leaves 68 are weighted so that they normally assume the open position shown in broken lines in FIG. 7 and so that, when a wheel rides on ears 72, leaves 68 will grip the tire, as shown in solid lines in FIG. 7.

Associated with each device 10 and 12, is a solenoid S, the armature 76 of which is normally biased by spring 78 to the right, as viewed in FIG. 6, so as to project below and support a sleeve 46, or 46', and, hence, the entire assembly in the upper, ineffective position of FIG. 2 or 5. The solenoids are series connected, by wires W, to the vehicle battery B and to normally open switch 80 which, as will be seen from FIG. 1, is accessible to the driver of the car. The underside of the free end of each armature 76 is bevelled as at 82 for a purpose which will hereinafter appear.

The operation is as follows:

When devices 10 and 12 are not in use, that is, when they occupy the positions of FIGS. 2 and 4 respectively, they are supported by the armatures 76 of the respective solenoids. When an emergency arises, the vehicle operator closes switch 80 simultaneously to energize all four solenoids. Energization of the solenoids pulls armatures 76 from under sleeves 46 and 46' whereupon, due to gravity and to the action of springs 60 and 60', devices 10 and 12 will instantly, and simultaneously, move into the ground gripping position shown in FIGS. 3 and 5. When the emergency is over, the operator rotates drums 50 and 50' to wind cables 54 and 54' to restore the parts to the positions of FIGS. 2 and 4 respectively. Since the undersides of armatures 76 are bevelled, they will be pushed to the left by the upward movement of the parts and, as soon as sleeves 46 and 46' have cleared the armatures, springs 78 immediately push the pins back to their supporting, broken line, position of FIG. 6.

It will be noted that front devices 10 are wholly independent of the front wheels of the vehicle so as not to interfere with steering, and that their spiked shoes contact the ground directly, thus giving the front end of the vehicle a total of four points of support and friction.

It will also be noted that rear devices 12 have clamps 68 which engage the sides of the wheels with a force which is a function of the weight of the rear axle so as to stop rotation of the wheels at the same time, which provides additional friction with the ground.

What I claim is:

An emergency brake and anti-skid device for an automotive vehicle having a chassis and front and rear wheels, said device including a housing carried by said chassis adjacent each of said wheels, horizontal guide channels carried by the opposite sides of said housing, a normally horizontal sleeve carried by said housing at a point above the ground, a plunger in said sleeve, a spring biasing said plunger outwardly of said sleeve, a spiked shoe carried by said plunger, a rotatable drum carried by said housing, a cable connected to said drum and to said plunger, a chain connected to said shoe and to said cable, and movable in said guide channels, the length of said cable being such that, when it is unwound from said drum, said sleeve will move to a substantially vertical position and said shoe will contact the ground, and so that, when said cable is wound on said drum, said sleeve will move to its upper horizontal position above the ground and said plunger will be moved inwardly of said sleeve against the action of said spring, a rearward extension carried by said shoe and so arranged that, when said shoe drops into contact with the ground, said extension forms a track on which said rear wheel rides, and a normally open clamp carried by said rear extension and including side walls hinged to said extension and having ears disposed above said extension, said side walls being weighted so as to move in opposite directions by gravity and so that, when a wheel rides on said ears, said side walls are moved into clamping position against the sides of said wheel.

References Cited in the file of this patent

UNITED STATES PATENTS

| | | |
|---|---|---|
| 650,688 | Lewis | May 29, 1900 |
| 1,004,733 | Besler | Oct. 3, 1911 |
| 1,334,807 | Siebachmier | Mar. 23, 1920 |
| 1,451,336 | Hochman | Apr. 10, 1923 |
| 1,495,916 | McNames | May 27, 1924 |
| 1,510,746 | Orr | Oct. 7, 1924 |
| 2,273,937 | Coate | Feb. 24, 1942 |
| 2,385,689 | Christiansen | Sept. 25, 1945 |
| 2,630,192 | Stenhouse | Mar. 3, 1953 |
| 2,718,283 | Ropp | Sept. 20, 1955 |
| 2,746,570 | Stahmer | May 22, 1956 |
| 2,789,665 | Wright | Apr. 23, 1957 |

FOREIGN PATENTS

| | | |
|---|---|---|
| 96,114 | Switzerland | Sept. 16, 1922 |